March 17, 1942. N. P. HARSHBERGER 2,276,486
COATING APPARATUS
Filed April 29, 1939
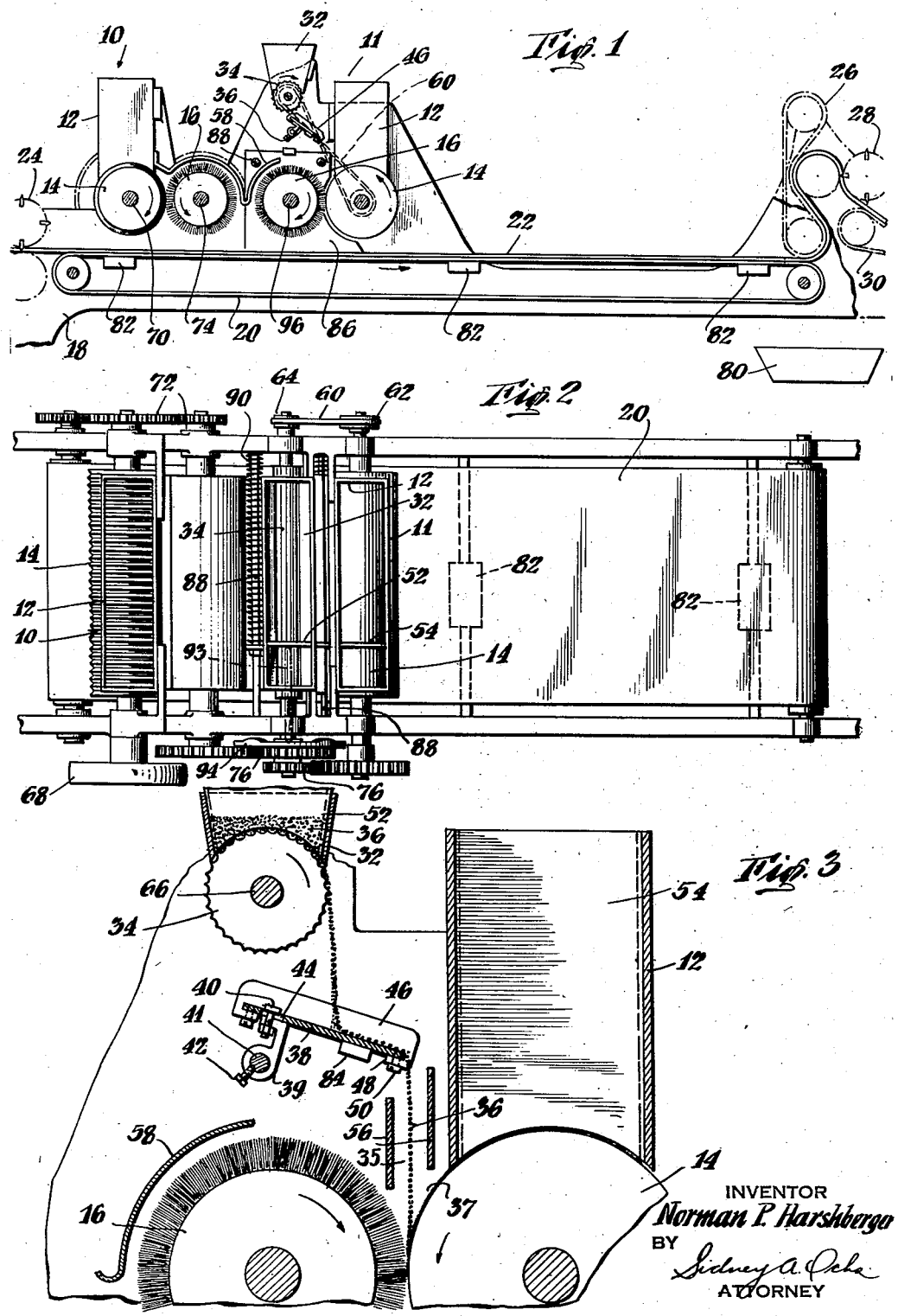

Patented Mar. 17, 1942

2,276,486

UNITED STATES PATENT OFFICE 2,276,486

COATING APPARATUS

Norman P. Harshberger, Scarsdale, N. Y., assignor, by mesne assignments, to Carbide and Carbon Chemicals Corporation, New York, N. Y., a corporation of New York Application April 29, 1939, Serial No. 270,730

9 Claims. (Cl. 91—44)

This invention relates to apparatus for coating particulate materials, for instance, roofing granules, and to apparatus for producing continuous coatings comprising particulate materials and a binder. The apparatus is particularly applicable to making cement coated roofing and siding, for instance, of the type disclosed in my prior Patent No. 1,913,667, granted June 13, 1933, wherein, for example, a felted fibrous base is saturated and coated with a bitumen such as asphalt, then surfaced with a layer of granular particles, and subsequently surfaced on the granule side with a cement composition.

The present invention is a continuation in part of my copending application Serial No. 26,770, filed June 15, 1935, now Patent No. 2,156,286.

Prior particulate coating methods have generally required large batch mixing and tumbling operations. Batch mixing has also been the case where it has been desired to provide coatings with aggregate material to furnish coloring and filler properties. These methods require much apparatus, many operations, and much handling of the materials.

The present invention aims to provide simple, efficient, and readily controlled apparatus for the purposes described.

An object of the invention is to provide apparatus for coating individual pieces of particulate material with coating compositions; in particular, compositions of a sludgy or plastic consistency.

Another object is to provide apparatus for producing fully coated individual particles, for instance, coated roofing granules.

A further object is to provide apparatus for extending composition coatings with aggregate material and in measured quantities.

Another object is to provide apparatus for bringing together measured quantities of coating materials and aggregate particles, and to continuously form one or more layers comprising said materials on a suitable base.

A further object is to provide apparatus for producing a structure of composition material, in which the density thereof has been varied at desired levels with the addition of aggregate material.

A particular object of the invention is to coat particulate materials, by feeding a relatively uniform layer of coating composition on a roll surface, to a rotary bristle brush type distributor, and prior to removing the coating, feeding a measured quantity of particulate material to the point of coating removal or in advance thereof, so that the same will be discharged by the distributor bristles with the coating material, and in a manner such that the individual particles of particulate material receive a coating thereof before being discharged.

These and other objects of the invention will in part be understood and in part be more particularly pointed out in the following description and in the claims taken in conjunction with the accompanying drawing, wherein Fig. 1 is a side elevation of apparatus embodying the invention;

Fig. 2 is a plan view of the apparatus shown in Fig. 1, and

Fig. 3 is an enlarged sectional view of the particulate feeding and coating apparatus shown in Fig. 1.

Referring to Figs. 1 to 3 inclusive, Fig. 1 shows a coating machine such as disclosed in my aforesaid copending application, and which comprises a plurality of coating means or units 10 and 11, each comprising means, such as a hopper 12, to receive coating material, a driven rotatable roll 14 forming a coating withdrawing means to feed a measured layer of coating composition and forming the bottom of the hopper, and a distributing member, for instance, a rotatable bristle impeller 16 operating on the fed composition and discharging a particle stream thereof on a moving receiving means or surface below. The surfaces of the roll 14 and the impeller 16 form an entrance angle having its apex at the position of removal of coating material from the roll 14. The units are suitably supported in a frame 18 by suitable brackets or other supporting means, more particularly illustrated in said prior application. An endless conveyor 20 is positioned below the coating units, preferably in close proximity to but out of contact with the distributor 16, and serves to convey suitable base material 22, which may be a web of mineral surfaced composition roofing material or individual shingle elements thereof, which have been made into blanks by a cutting roll 24, for coating, by the discharging coating streams. Where a web of material is fed, such may be subsequently delivered in coated condition to a pull roll assembly 26, whereby the web may be passed into contact with a cutting roll 28 and severed into sections of desired size, and these delivered to a conveyor belt 30 for further operations.

In the operation disclosed in Fig. 1, the base material to be coated will receive one or two applications of coating composition, depending on whether one or both of the coating units are in operation. Thus, for example, upon passing under the first coating unit 10, the base material will receive a base coating of the composition in the hopper of this unit, and on subsequently passing beneath the coating unit 11, will receive a second coating. It will be understood that further of these hoppers may be positioned along the path of the conveyor 20, and additional coatings be applied to the base material. Likewise, instead of using the composition as a coating, layers of suitable thickness may be formed of the composition upon the conveyor 20, and such layers removed to form various products, for example, where the composition is one of cement, suitable shingle slabs or wallboard might be produced.

In these coating operations, it is sometimes desired to include certain aggregate material with the coating composition, and it is a feature of the invention to provide means that will enable such solid material to be added to the coating composition so that it becomes well mingled therewith, and such that substantially each particle of the aggregate becomes well treated with the composition. Moreover, the procedure to be described enables me to obtain a uniform distribution of the aggregate and provides all portions of the fed coating composition with their proper amounts of aggregate material. Examples of aggregate material that may be handled in accordance with this invention are, for example, comminuted fibrous, flocculent or granular materials such as asbestos, ground cork, mica flakes, graphite, powdered coloring pigments, crushed slate, tile or silica. One of more of these may be brought together with various coating compositions, for example, an argillaceous cement such as a hydraulic cement like Portland or aluminate, water emulsions such as of bitumen, or phenolic resins, resinous molding compounds wetted with suitable solvents, casein compositions, rubber or latex in suitable solvents, and silicate coatings, for instance, soluble sodium silicate. Preferably, these compositions will be in a plastic or sludgy condition such that they may be fed by the character of hopper and feed roll apparatus disclosed in the drawing. However, it will be understood that where these coatings are of a more liquid character that suitable feed mechanism, for example, of the character disclosed in my application filed of even date herewith, may be substituted in lieu of the hopper 12.

In order to feed the aggregate extending or particle core (hereinafter referred to as aggregate material) material, a suitable receiving means such as a hopper 32 may be provided having a feeding means such as a roll 34 forming the bottom thereof. The feed roll may have any character of surface that will provide a positive feed, for instance, it may, as shown in the drawing, be fluted. The hopper and feed roll combination are positioned so as to apply a stream 35 of the aggregate material 36 to substantially the vicinity of the bight or junction formed by the distributor 16 and a layer 37 of coating composition carried by the feed roll 14 of the coating composition unit. In some instances, an adjustable guide means such as a chute 38 may be employed to control the point of application of the aggregate material. Also, sometimes it is preferred that the material from the hopper 32 reach the coating layer 18 somewhat in advance, for instance, a short distance before contact by the distributor 16. The latter is found desirable where the operation is one to fully coat particles, such as when coated roofing granules are being made; also, when the aggregate material being fed is of a light weight character, so as to keep the same out of the influence of the air stream of the impeller. Upon reaching the coating layer 18, the particles of the stream 36 come into the influence of the brush 16 and are well mingled with the coating and then discharged as by impelling against the base material 22 or conveyor 20, as the case may be. The described procedure assures an intimate contact between the particles of the aggregate and the coating composition, so that the particles of comminuted material are substantially individually coated with the coating composition before discharging.

The guide 38 may be in the form of a sheet metal plate supported by rocker arm 39 and secured thereto by bolts 40. The arm 39 may be clamped to a stationary support such as a rod 41, by set screws 42. Obviously, in this manner the chute or guideway 38 may be adjusted to any suitable radial position. The plate 38 may also be provided with elongated slots 44 so that the discharge end of the guide may be somewhat adjusted in this manner. The guide plate may further be provided with one or more partition plates 46, where two or more different aggregates are being fed. The partition 46 is provided at its outer edges with flat under-fingers 48 carrying clamp screws 50. When the member 46 is used, it will generally be in the same relative position as the partition member or members 52 of the hopper 32 and the partition plate 54 of the coating composition hopper 12. The feed mechanism may also be provided with one or more baffle plates 56 supported between the side frames 18. These may be positioned to further guide the particle stream or to prevent outside influence on such stream of particles. Also, the impellers 16 may be covered by a suitable shield 58 to prevent throwing of the coating composition by this member.

The aggregate feed roll 34 may be driven by any suitable means, such as by a belt 60 and pulleys 62 and 64 secured respectively to the shafts of the rolls 14 and 34. Power may be applied for rotating the coating composition feed rolls 14 and the distributing or discharge elements 16 by any suitable means, for example, a belt (not shown) engaging a pulley 68 carried upon the feed roll shaft 70 of the coating unit 10. The impeller 16 of this unit may be driven by a set of gears 72 mounted on the shaft 70 of the coating feed roll and shaft 74 of the impeller 16. The impeller 16 and feed roll 14 of the coating unit 11 may be driven from the shaft 74 by means of cooperating gears 76. It is to be noted that the gears 72 and 76 are so arranged that the distributors 16 are driven at a higher speed than the feed rolls 14. It is obvious that the specific type of driving mechanism for the various rolls may be varied as desired. A specific embodiment has been shown for purposes of illustration only. The impellers and also the feed rolls of both hoppers 12 and the hopper 32, may be driven by separate motors, if desired, in order to obtain any desired speed differential between these members.

It will be understood that, while the aggregate feed unit 32 has been in the drawing shown only in connection with the coating unit 11, a similar unit may be provided for the coating unit 10. Moreover, it will be understood that as many of these aggregate feed mechanisms may be provided as there are coating units. It may be seen that by properly controlling the speed of rotation of the roll 34, the rate of delivery of aggregate material to the coating carrying roll 14, may be controlled. Likewise, the speed of the roll 14 will control the rate of delivery of coating material. These speeds will be selected for the type of result that is desired, that is, whether the combined materials are to be formed, for instance, into a coating layer or into individually coated particles. It will be understood that the aggregate materials may be readily combined with the coating composition and in any density, and will be thoroughly mingled with the coating material before delivery by the impeller or other distributing device.

The described arrangement is particularly useful for coating granules or other particles which it may be desired to provide with an encasing film or layer of coating material. For example, it may be desired to coat individual roofing granules of a size between 8 and 12 mesh, such as are customarily used for surfacing asphalt roofing materials. To accomplish this, base granules or cores are placed in the hopper 32 and a suitable coating composition, for instance, a colored hydraulic cement composition, is placed in the hopper 12 of the coating unit 11. The rate of feed of the roll 34 will be controlled so that a proper proportion of base granules are fed to the layer 37 of coating material carried by the feed roll 14. In the operation, the granules will be brought into contact with the coating material and then discharged by the distributor or impeller 16 in a coated condition. The impeller 16 will be of the bristle or spring filament type. During contact by the impeller, the base granules receive what is believed to be a spinning action whereby they are fully coated. By adjusting the viscosity of the coating composition, the speeds of the bristle impeller 16 and the rolls 14 and 34, the point of application of the granules, and the amount of wipe of the brush bristles, the granules may be projected in a fully coated condition or coated to any desired extent and with coatings of desired characteristics. The coated granules may be deposited by the distributor 16 upon the moving conveyor 20, which may be in the nature of a screen or rubber belt of sufficient length, and may be collected at a subsequent point, for instance, by dropping into the collection tray 80.

Obviously, the distance to be traveled by the coated granules from the point of deposit to their point of collection will depend upon the nature of the coating and any further operations which it may be desired to perform on the coated pieces before reaching the collection point. In certain cases it may be desired to apply the coated granules directly to a base material, for instance, the web 22 carried by the conveyor to provide an ornamental or weather surfacing therefor. Where the base material has received a prior coating layer from the coating unit 10, the freshly coated granules may be deposited on such coating and be bonded thereto.

Suitable vibrators 82 may also be provided for keeping the coated granules agitated, where they are directly deposited upon the conveyor 20. The vibrators may be, for instance, of an electromagnetic type and may be positioned against the under side of the conveyor belt, as shown in Fig. 1.

A similar vibrator 84 may be provided for the guide plate 38 of the aggregate feed mechanism. It will be noted that the impeller 16 may be provided with a baffle 86 in line with the partition 54 of the coating composition hopper so as to separate compositions of different character as they are impelled on the web 22. The baffle 86 may also be provided with suitable vibrating means, for instance, that disclosed in my prior copending application aforesaid, to dislodge any composition which may adhere thereto. This means may comprise a pair of transverse rods 88, supporting the baffle 86. Springs 90, surrounding the rods 88 and engaging the frame 18, urge the baffles against stops carried by the rods. A pin 93 (Fig. 2) is slidably carried in the frame 18, and at one end bears against the baffle 86 and at the other end against a cam 94 which may be mounted, for example, on the shaft 96 of the impeller 16. As the cam 94 rotates, the pin 93 is caused to reciprocate transversely causing a corresponding movement of the baffle plate 86.

The apparatus of my invention may readily be used to deliver coating compositions containing considerable filler, and produce mastic forms on the conveyor 20 below. In some instances, it may be necessary to heat the distributor 16 or even the feed rolls 14, in which case suitable steam piping may be provided for such purpose through the center of the respective members, all as more particularly disclosed, for example, in Fig. 15 of my prior application aforesaid. In such an operation the coating may be, for example, a hot bitumen or any other character of congealable coating.

In operating the mechanism of Fig. 1, for instance, to coat a roofing web with a base cementitious composition and with a surface cementitious coating containing a fireproofing and strength provided aggregate, the following takes place: The hopper 12 of the coating unit 10 is provided with a base cement coating composition and the hopper 12 of coating unit 11, with a coating of similar character but which may include some coloring material. The hopper 32 is provided with a supply of comminuted asbestos with or without further coloring material. The coating compositions in the hoppers 12 will preferably be in a plastic or sludgy condition. Power is supplied for rotating the feed rolls and distributing mechanism, and the rolls 14 each feed a predetermined layer of the cement composition from their respective hoppers to the point of contact of bristle impellers 16, by which the composition is applied in a particle stream to moving web 22 to reform in a layer thereon. The secondary coating or surface coating provided by the coating unit 11, will immediately follow the first or base coating provided by the coating unit 10, and the former will carry with it a deposit of aggregate material from the hopper 32, which in this case will be asbestos fiber with or without a coloring aggregate. The aggregate will be dropped upon the secondary coating as it is carried on the roll 14, and slightly in advance of the distributor so that this material will be well coated with the cement composition before being projected against the base web. In this manner, a structure is provided having a base cementitious coating and a surface colored coating carrying a fireproofing and strength giving aggregate. Where the base web is, for instance, an asphalt coated granule surfaced one, the force may be sufficient to cause the cement composition to penetrate the surface of the asphalt between the granules and make a firm bond therewith.

It will be understood that each of the hoppers 12 and hopper 32 may be provided with suitable gates, for example, the gate rollers shown in the copending application of Thomas Brady, Serial No. 114,909, now Patent No. 2,156,901, whereby to accurately and continuously measure out the amount of coating composition or aggregate to be fed by the respective feed rolls. The direction of rotation or motion shown in the drawing for the various moving parts are the preferred directions.

From the above description, it will be seen that I have provided novel apparatus for combining aggregate particles and coating compositions, and apparatus for forming individually coated particles. The disclosed embodiment of the apparatus has been set forth for the purpose of illutration only. It will be understood that many changes may be made and will suggest themselves to those skilled in the art without departing from the spirit and scope of my invention, which is only to be limited in accordance with the following claims when taken in conjunction with the prior art.

I claim:

1. Coating apparatus comprising means to receive a supply of coating material, means to withdraw a predetermined quantity of coating material from said coating supply means, a rotary bristle distributor to remove coating from said withdrawing means and discharge the same upon a receiving surface, a second means to receive a supply of particulate material, and means to feed said particulate material from such supply receiving means to said coating on the withdrawal means, and to a position in advance of removal of said coating by said distributor.

2. Coating apparatus comprising means to receive a supply of coating material, rotary means for withdrawing a layer of coating from said coating supply means, a rotary impeller to engage said coating layer, a second means to receive a supply of particulate material, means to feed said particulate material to said coating layer and to a position in advance of the impeller, whereby both coating and particulate material will be co-mingled by said impeller upon removal from said withdrawing means, and means to receive the co-mingled material discharged by said impeller.

3. Coating apparatus comprising a hopper for receiving coating material, a rotary feed roll for withdrawing coating from said hopper, a rotary bristle member to remove coating from said feed roll, a second hopper for receiving a solid particulate material, means to withdraw said particulate material from said second hopper, and guide means to deliver said particulate material to said coating on the feed roll at the position of removal, whereby both will be removed by said bristle member and discharged upon a receiving surface.

4. Apparatus for coating particulate material comprising a hopper for receiving coating material, a rotary feed roll for withdrawing a layer of coating material from said hopper, a rotary bristle impeller to remove coating from said feed roll, a second hopper for receiving a solid particulate material, means to deliver said particulate material to the bight formed by said feed roll and impeller, whereby said coating and particulate material will be co-mingled and the pieces of particulate material will be coated, and moving means to receive the coated particulate material when discharged by said impeller.

5. Coating apparatus comprising a hopper for receiving coating material, a rotary feed roll for withdrawing a layer of coating material from the bottom of said hopper, a rotary bristle impeller to remove coating from said coating feed roll, a second hopper for receiving a solid particulate material, means for withdrawing particulate material from said second hopper, adjustable guide means to receive particulate material from said feed roll and to discharge said material at the junction of said coating feed roll and impeller, and moving means to receive a particle stream comprising said coating and particulate material discharged by said impeller.

6. Apparatus for coating base material comprising means to move a base to be coated, coating means to apply a coating on said base material, and a second coating means for applying coated particulate material to said coated base, said second coating means comprising a hopper for receiving coating material, a rotary feed roll for withdrawing a layer of coating from said hopper, a rotary bristle impeller to remove coating from said feed roll, a second hopper for receiving solid particulate material, and means to deliver a stream of said particulate material to said coating on said feed roll at the junction of said feed roll and impeller, whereby said particulate material will be coated by said impeller and distributed over said coated base material.

7. Coating apparatus comprising means to receive a supply of coating material, means to carry a predetermined quantity of coating material from said coating supply means, impeller means to remove coating from said coating carrying means and adapted to discharge said coating upon a receiving surface, the surfaces of said coating carrying means and said impeller means forming an entrance angle having its apex at the position of removal of coating material from said coating carrying means, a particulate material supply means, and means to deliver particulate material from said particulate material supply means within the said entrance angle of said coating carrying means and impeller means.

8. Coating apparatus comprising a rotary feed member to carry coating material withdrawn from a source of supply, a rotary distributor to remove coating to be carried by said feed member and to impel it upon a receiving surface, the surfaces of said rotary feed member and rotary distributor being positioned to form an entrance angle, means to supply a stream of particulate material to the coating to be carried by said feed member and within said entrance angle and baffle means within said entrance angle to aid in guiding said particulate stream and substantially prevent air stream influence thereon.

9. Coating apparatus comprising a hopper for receiving coating substance, a rotary feed roll for withdrawing coating substance from said hopper, a second hopper for receiving a solid particulate material, rotary means to deliver particulate material from said hopper to the coating substance withdrawn by said feed roll and to a position in advance of removal of said coating substance from said feed roll, and a rotary bristle member to engage said coating substance and particulate material and commingle said materials before discharging them upon a receiving surface.

NORMAN P. HARSHBERGER.